United States Patent Office 2,698,870
Patented Jan. 4, 1955

2,698,870

SEPARATION OF BRANCHED CHAIN HYDROCARBON FROM MIXTURES CONTAINING CYCLIC AND STRAIGHT CHAIN COMPONENTS

Herman S. Bloch, Chicago, and Edward M. Geiser, Downers Grove, Ill., assignors to Universal Oil Products Company, Chicago, Ill., a corporation of Delaware No Drawing. Application April 2, 1951, Serial No. 218,891

10 Claims. (Cl. 260—676)

This invention relates to a process for segregating branched chain hydrocarbons from mixtures thereof with other hydrocarbons of straight chain and/or cyclic structure. More specifically, the invention concerns a liquid-solid phase separation process utilizing a modified urea separating agent for removing the branched chain hydrocarbon components from hydrocarbon mixtures containing other structural classes of hydrocarbons and recovering, if desired, said branched chain components from the separating agent.

The segregation or removal of branched chain isomers from hydrocarbon mixtures, either for the purpose of enriching the mixture in straight chain or cyclic components or for recovering the branched chain components from the mixture, has become increasingly important in industry with the growing realization that the activity, potency and desired physical properties of a product may depend upon the specific structure of the various possible hydrocarbons utilizable as reactants in the manufacture of the final product. Thus, in the manufacture of detergents of the alkyl aryl sulfonate type, it is now known that detergency of the product is generally greater when the long chain nuclear alkyl substituent is a straight chain alkyl group rather than a highly branched chain group, although the solubility of the sulfonate salt detergent in water is somewhat greater for the products containing branched chain alkyl substituents than for the straight chain alkyl substituted isomers. Numerous other instances of the influence of structure on the particular properties of the ultimate product are known and it therefore becomes desirable to enhance the preferred properties of the product by the choice of the hydrocarbon reactant having the preferred structure, when such preference is known and is readily attainable by the preliminary application of separation techniques to the hydrocarbon starting material involved in the preparation of the product. It is one object of the present invention to provide a separation process for segregating hydrocarbons having a particularly preferred structure. Another object of the invention is to provide a separation process which is relatively simple to operate and in which the separable components are readily recovered from the hydrocarbon mixture or from the separating agent. Still another object of the invention is to provide a separation process utilizing a separating agent which may be repeatedly regenerated to restore the same to its initial effectiveness.

In one of its embodiments, the present invention concerns a process for separating a branched chain hydrocarbon from a mixture thereof with other structural classes of hydrocarbons, including straight chain and cyclic hydrocarbons, which comprises contacting the hydrocarbon mixture with a separating agent comprising a solid resinous condensation product of an aldehyde and a urea-type compound at a temperature of from about −10° to about 50° C. and thereafter segregating non-absorbed raffinate hydrocarbons from the separating agent containing said branched chain hydrocarbon.

A more specific embodiment of the invention relates to a process for recovering a branched chain hydrocarbon from a hydrocarbon mixture containing other structural classes of hydrocarbons, including straight chain and cyclic hydrocarbons, which comprises passing said hydrocarbon mixture at a temperature of from −10° to about 50° C. upwardly through a bed of solid particles of a resinous condensation product of formaldehyde and urea containing a predominant molar proportion of urea, removing a hydrocarbon effluent stream from the upper portion of said bed, thereafter passing through said bed of resinous particles at a temperature of from about 30° to about 100° C., a straight chain hydrocarbon having a substantially higher boiling point than the branched chain hydrocarbon component of said mixture, thereafter separately collecting a second effluent stream containing a mixture of said branched hydrocarbon and said straight chain hydrocarbon of substantially higher boiling point and fractionally distilling said second effluent to segregate said branched chain hydrocarbon component.

It is now known in the literature and patent art that straight chain compounds, including straight chain hydrocarbons, may be separated from a mixture containing the same by contacting the mixture at specific temperature conditions with complex-forming agents such as urea and thiourea, the straight chain components selectively reacting with the urea separating agent to form a crystalline adduct which may be separated from the non-reacted hydrocarbon and the adduct decomposed to recover the straight chain component. For example, Patents No. 2,520,715 and No. 2,520,716, issued L. C. Fetterly are representative of this art. Whereas the above prior art is primarily directed to a process in which the straight chain components only are selectively removed from a mixture of various structural classes of compounds and unmodified urea or thiourea are utilized as the separating agents, it has now been discovered that certain modified ureas in the form of urea-aldehyde resins substantially free from unreacted urea may be employed as separating agents to obtain an entirely different type of separation in which the selective removal of branched chain hydrocarbons from mixtures thereof with other classes of hydrocarbon components is effected. The separation mechanism involved in the latter process of separation is believed to depend upon the principle of selective adsorption, rather than the type of adduct formation involved in the extraction of a straight chain hydrocarbon by urea. Although not intending to be limited to any proposed theory of the mechanism involved in the present separation process, it is believed that the present urea-aldehyde resinous condensation products utilized as separating agents in the present separation process based upon the above discovery retain the branched chain hydrocarbon components by virtue of physical forces, the process being descriptively characterized as essentially a molecular sieving or filtering operation in which the cross-section of the branched chain hydrocarbon components is believed to be too large to pass through the porous structure of the resinous separating agent, although sufficiently large to permit the passage of straight chain hydrocarbon components having relatively smaller chain cross-sections, and too small to permit the entry of cyclic hydrocarbons. The resinous separating agent thereby retains the branched chain components in its porous or capillary structure while permitting the straight chain and cyclic components to pass into the effluent stream from the process.

Branched chain aliphatic hydrocarbon which may be separated and recovered in accordance with the process of this invention from hydrocarbon mixtures containing the same and other structural classes of hydrocarbons may be of either olefinic or paraffinic structure and may be separated from both paraffinic and/or olefinic straight chain hydrocarbons as well as cyclic hydrocarbons, including both naphthenic and aromatic hydrocarbon types. The components of the hydrocarbon mixture utilized as charging stock in the present separation may vary considerably in molecular weight, although the method is particularly adaptable and efficient when applied to mixtures in which the branched chain hydrocarbon component contains at least six, and preferably at least eight carbon atoms per molecule. Thus, petroleum fractions of either normally gaseous or normally liquid composition, such as petroleum refinery light pressure distillates containing such hydrocarbons as isobutylene and normal butylene as well as propylene and propane, higher pressure distillate fractions recovered by fractionation of crude oil or the products formed by thermally or catalytically cracking petroleum fractions, gasoline and gas-oil fractions, the products of low molecular weight olefin polymerization, gasoline reforming and hydroforming products and iso-paraffin-olefin alkylation reaction products, the latter usually containing a relatively high proportion of branched chain hydrocarbons, may be subjected to the present separation process to recover the relatively more branched chain components therefrom. The process is particularly applicable to hydrocarbon mixtures containing isomers having the same molecular weight which boil at substantially the same boiling point or which form azeotropes with other hydrocarbons and which are at best separated by fractional distillation only with great difficulty. Although particularly useful for the separation of normally liquid hydrocarbon mixtures, the present process under certain conditions of operation may be extended to gaseous mixtures such as the separation of isobutylene from mixtures of four-carbon atom hydrocarbons.

The present separating agent referred to herein as the resinous condensation product of a urea-type compound with an aliphatic aldehyde is utilized in the solid granular form which may be packed into an extraction column to form a bed through which the hydrocarbon mixture is allowed to percolate in accordance with conventional adsorption separation processes utilizing a solid adsorbent material.

The urea-type compounds which may be utilized in the condensation may be selected either from the carbonyl ureas or thioureas which may be further substituted on the amide nitrogen atoms by not more than one alkyl group per nitrogen atom, said alkyl groups containing not more than about 8 carbon atoms per group. Thus, typical urea-type compounds utilizable in the condensation include such reactants as urea itself, thiourea, N,N'-dimethylurea, N,N'-dimethylthiourea, N,N'-diethylurea, N,N'-diethylthiourea, N,N'-dipropylurea, N-methylurea, N-ethylurea, N-propylurea, N-vinylurea, N-allylurea, N,N'-divinylurea, N,N'-diallylurea, and homologous N-mono-alkyl and N-mono-alkenyl substituted ureas. Guanidine and substituted guanidines, as well as condensation products of guanidine with itself or with urea, are also suitable for use. Among such materials are guanylurea, dicyandiamide, dicyanoguanidine, melamine, and the like.

The aldehydes condensable with the urea-type reactant to form the resinous separating agent include formaldehyde and its saturated homologs as well as the unsaturated analogs containing up to about 7 carbon atoms per molecule. Typical aldehydes include formaldehyde, either in its aqueous solution or as the trioxymethylene polymer, acetaldehyde, glyoxal, propionaldehyde, acrolein, n-butyraldehyde, isobutyraldehyde, crotonaldehyde, n-valeraldehyde, isovaleraldehyde, 2,2-dimethylpropionaldehyde, and homologous aldehydes generally containing not more than about 7 carbon atoms per molecule. The condensation of the urea-type compound and aldehyde reactant may be effected in either acidic or basic media at temperatures of from about 30° to about 120° C. and at sufficient pressure to substantially maintain the reactants in liquid phase during the course of the condensation reaction. The molar ratio of the urea-type compound and aldehyde reactants is at least mole for mole and preferably from about 1.2 to about 5 moles of the urea-type compound per mole of aldehyde in the case of urea-type compounds containing two aldehyde-reactive nitrogen atoms. The latter resin containing a predominate proportion of the urea-type component produces the most effective resinous condensation products for the present separation process. The reaction is preferably catalyzed with an acidic type material which may be selected from either the inorganic mineral acids or certain organic acids, including dilute sulfuric acid, hydrochloric acid, and phosphoric acid of the mineral acids and acetic acid, a bromo or chloroacetic acid, phthalic acid, oxalic acid, benzoic acid, toluene sulfonic acid, citric acid, tartaric acid, methane sulfonic acid, etc. Basic reagents may also be utilized as catalysts for promoting the condensation, suitable reagents for this purpose including aqueous sodium and potassium hydroxide, ammonia, and ammonium salts, pyridine, the alkyl amines as well as the alkali metal carbonates and bicarbonates. Since the resin is desirably prepared in as porous a condition as possible, various foaming agents may be incorporated into the condensation reaction mixture which produce a gas upon heating the liquid resin or resin-forming reaction mixture which solidifies into a porous solid resin upon cooling. Typical of such foaming agents are substances such as sodium bicarbonate, ammonium carbonate, ammonium bicarbonate and other substances which decompose into gaseous products by heating at relatively low temperatures. The solid resinous condensation product may be utilized in the adsorption process in any particle size range found to be desirable for the particular extraction process, depending upon the flow rate desired, the degree of separation required, and the molecular weight of the hydrocarbon components comprising the charging stock to be separated. In general, the efficiency of separation increases as the particle size of the urea-aldehyde resin decreases, the efficiency being directly proportional to the surface area of the particles exposed to the hydrocarbon stream charged to the process. In order to minimize channeling of the liquid hydrocarbon stream through the bed of adsorbent, the particles of urea resin are preferably of uniform size and are evenly distributed in the extraction bed to provide a uniform cross-sectional resistance to the flow of the liquid hydrocarbon mixture through the bed of extractant. The size of the resinous particles are preferably from about 0.2 to about 4.0 mm. in diameter, or from about 60 to about 6 mesh. The particle size, however, may be selected beyond these limits, the size ultimately preferred depending upon various factors which control the selection is any particular operation.

The separation method of the present invention is effected substantially in accordance with the following procedure: (1) the hydrocarbon mixture containing a branched chain hydrocarbon component to be separated is percolated through a fixed bed of the urea-aldehyde resinous particles present in an extraction column which provides an elongated extraction zone relative to the direction of flow of the hydrocarbon mixture. The hydrocarbon mixture, preferably at a temperature and pressure sufficient to maintain substantially liquid phase, is charged either into the top or into the bottom of the extraction column at a temperature of from about −15° to about 50° C. and at a rate sufficient to permit the selective adsorption of the branched chain hydrocarbon components of the mixture on the dry particles of resinous adsorbent. The flow of hydrocarbons into the extraction column is continued until the resin becomes substantially saturated with respect to its ability to absorb additional branched chain hydrocarbon components. The flow of the hydrocarbon mixture through the extraction column may, however, be interrupted prior to complete saturation of the resinous adsorbent, since under practical operating conditions, the effluent stream from the column comprising non-adsorbed raffinate hydrocarbons contain progressively greater proportions of the branched chain isomers as the point of complete saturation of the resin with the branched chain components approaches.

(2) Following the adsorption stage of the process, the flow of hydrocarbon mixture through the bed of resinous adsorbent is then discontinued and the adsorbed hydrocarbons removed from the relatively spent resinous particles either by thermal liberation from the resinous separation agent or by displacing the adsorbed branched chain hydrocarbons from the resinous adsorbent by contacting the "spent" resin with an elutriating agent such as a polar compound. The adsorbing and separating capacity of the resin is thereby regenerated and the resin may be utilized repeatedly for successive separating operations following the removal of the adsorbed branched chain hydrocarbons from the system. In the former regeneration procedure whereby the "spent" resinous adsorbent is regenerated thermally, a liquid hydrocarbon wash stream which does not contain components adsorbed by the resinous separating agent and preferably having a boiling point substantially different from the branched chain hydrocarbon adsorbed on the resinous particles (thereby permitting the latter to be readily recovered by mere fractional distillation from the effluent stream) is passed over the "spent" resin at a temperature sufficient to liberate the adsorbed branched chain hydrocarbons from the resinous adsorbent, preferably at a temperature of from about 50° to about 150° C. The flow of the latter hydrocarbon wash stream is continued until the effluent stream from the adsorption column contains substantially no branched chain hydrocarbons, indicating the point at which substantially complete removal of the extract hydrocarbons from the resinous adsorbent has been attained. The hydrocarbon wash stream is preferably passed through the extraction column in a direction opposite to the flow of the original hydrocarbon mixture, thus tending to regenerate the resin in the inverse order of adsorption. Particularly preferred hydrocarbons for washing the spent resinous adsorbent are the relatively low molecular weight hydrocarbons such as liquid propane, butane, pentane, and hexane which are readily recovered from the hydrocarbon effluent by fractional distillation as a means for recovering the branched chain adsorbed hydrocarbon.

In the alternative method for removing the branched chain adsorbed hydrocarbons from the resinous adsorbent and for regenerating the adsorbent for successive extractions, the spent extractant is contacted with an elutriating agent comprising a polar compound which displaces the adsorbed branched chain hydrocarbons from the resin and substantially restores the same to its regenerated condition suitable for again contacting the initial hydrocarbon charging stock. When utilizing an elutriating agent of the latter type, the regeneration may be effected at temperatures substantially lower than those required for thermal decomposition, preferably from about 10° to about 100° C. and the elutriating agent may be selected from compounds which are substantially immiscible with the branched chain hydrocarbon extract, thereby permitting rapid and efficient separation from the elutriating agent by mere decantation from the resulting two-phase mixture. Suitable polar compounds for this purpose include water and a relatively large number of organic compounds containing a polar group, such as the alcohols, preferably methyl and ethyl alcohols, the ketones such as acetone, methylethylketone, diethylketone, glycols such as ethylene glycol, diethylene glycol, etc., the chlorinated hydrocarbons, such as ethylenedichloride, dichloropropane, and others. The preferred elutriating agents for this purpose are water and methyl alcohol, since the latter are relatively effective and may be recovered from the branched chain adsorbed hydrocarbon by simple decantation.

(3) Following the removal of the branched chain adsorbed hydrocarbons from the resinous adsorbent, the extraction bed is preferably dried or otherwise treated to remove the residual elutriating agent or hydrocarbon wash liquid and to prepare the extraction bed for another extraction-regeneration cycle in which additional quantities of the hydrocarbon mixture are charged to the extraction column for further separation. For this purpose, air is passed through the porous particles of the resinous adsorbent at a rate sufficient to remove the residual liquids from the extraction column either by evaporation or by physical entrainment in the air blown through the column. When water is utilized as the elutriating agent, it is particularly desirable to dry the resinous adsorbent prior to reuse.

The extraction by adsorption involved in the present separation process is effected in any suitable apparatus, generally consisting of one or more extraction columns packed with the resinous absorbent, preferably in finely divided particle size. The adsorbent may be placed as a compact stationary bed within the column or distributed on trays or grids placed in the extraction tower. An arrangement, generally considered a preferred form of the extraction apparatus for commercial application of the process, is a system utilizing a multiplicity of extraction beds to enable the operation of a continuous, cyclic process, particularly when the charging stock is available continuously as a by-product of a particular hydrocarbon conversion or other process. In thus providing for a multiplicity of extraction beds, at least one bed is utilized as an extraction tower in stage (1) of the process, at least one bed is involved in the removal of the branched chain adsorbed hydrocarbon from the extraction bed, as described in stage (2) above, and, when desired, at least one bed is undergoing the drying procedure following the removal of the branched chain hydrocarbon from the resinous adsorbent as described in stage (3), above. The preferred direction of flow of the hydrocarbon mixture into the bed of resinous adsorbent is from the bottom up, thereby maintaining the void spaces between the particles of resinous adsorbent immersed in hydrocarbon liquid at all times and enabling a greater degree of control of the rate of flow through the bed of adsorbent. In order to maintain the porosity of the extraction bed and permit the hydrocarbons to flow readily through the extraction tower, it is often desirable to mix a granular spacing material with the particles of resin. Spacing materials for this purpose are preferably inert granular particles of approximately the same size as the resinous adsorbent materials, including such substances as sand, granulated solid resinous and plastic materials, such as crushed and sieved polystyrene, phenol-formaldehyde resin, polyvinylchloride resin, polymethylmethacrylate resin, fibrous material such as asbestos and other substances of like character.

If desired, the various liquid streams charged into the extraction column may be admitted through multiple inlet ports and the effluent may be likewise withdrawn from the column through multiple outlets, preferably distributed vertically along the column. The arrangement of inlet and outlet ports in this manner reduces the hydrostatic head of the liquids in the extraction column and eliminates operation of the process at excessively high pressures when a high rate of throughput is desired.

Specific embodiments of the present invention are illustrated in the following examples, which, however, are not intended to limit the generally broad scope of the invention in strict accordance therewith.

*Example I*

A synthetic hydrocarbon mixture containing equimolar proportions of dodecene-1 and iso-octane and having a refractive index of 1.41386 was passed through a vertical column of Ureaform resin approximately 10 inches high at a temperature of about 4° C., the fixed bed of resin being maintained at the latter temperature by circulating water cooled to approximately 4° C. through an annular chamber surrounding the fixed bed of resin. The resin was a condensation product of urea and formaldehyde containing a ratio of 1.2 moles of urea per mole of formaldehyde and having a total nitrogen content of 37.7%. The crushed Ureaform resin was sieved to a fine mesh size (to pass a 100-mesh screen) and packed into the extraction column. The hydrocarbon mixture was added dropwise into the top of the column and 2.5 cc. fractions of the effluent were collected from the stream removed from the bottom of the column. The refractive index and X-ray dispersion values for each of the fractions was determined and from the resulting data the mole per cent of dodecene-1 in each of the fractions was determined. On this basis, the mole per cent of dodecene-1 in the first fraction was 51.5% and gradually increased to 53.8 for the sixth fraction. When the flow rate of the mixture through the extraction column was reduced to approximately one-half the former rate, the mole per cent of dodecene in the effluent fractions was increased to 55.0%. After passage of approximately 250 cc. of the hydrocarbon mixture through the bed of resinous adsorbent, the column was allowed to drain and water at 20° C. was added dropwise into the top of the column and the effluent separately collected. The hydrocarbon portion of the effluent was allowed to stratify above the water layer and a refractive index and dispersion determination on the hydrocarbon layer indicated the same to contain approximately 72 mole per cent of iso-octane.

*Example II*

A synthetic hydrocarbon mixture containing approximately equimolar proportions of iso-octane and toluene and having a refractive index of 1.43118 was added dropwise into the extraction column of Example I containing a fresh sample of Ureaform resin and the effluent raffinate again collected in 2.5 cc. fractions. The column was maintained at a temperature of approximately 8° C. by the method described in Example I. The initial fraction contained 52.6 mole per cent toluene which was increased to 67.5 mole per cent upon the continued passage of the hydrocarbon mixture through the extraction column. The adsorbed hydrocarbon on the Ureaform resin was removed by passing n-octane through the extraction column at a temperature of 60° C. Fractionation of the effluent to remove the heptane component indicated that the effluent contained approximately 80 mole per cent of iso-octane.

A similar adsorption separation utilizing the procedure indicated above and charging a hydrocarbon mixture containing equimolar proportions of cyclohexane and iso-octane resulted in the enrichment of the effluent in cyclohexane by 7.5 mole per cent. The extract product recovered from the Ureaform resin contained approximately 70% of iso-octane.

We claim as our invention:

1. A process for separating a branched chain aliphatic hydrocarbon from a liquid mixture thereof with at least one hydrocarbon selected from the group consisting of straight chain aliphatic hydrocarbons and cyclic hydrocarbons which comprises introducing the hydrocarbon mixture into a bed of porous, solid particles of a resinous condensation product of an aliphatic aldehyde and a urea-type compound selected from the group consisting of urea, thiourea, and the N-mono-alkyl and alkenyl-substituted ureas and thioureas, contacting the hydrocarbon mixture with said bed of particles at a temperature of from about $-15°$ to about $50°$ C. and a pressure sufficient to maintain the hydrocarbons in liquid phase, the thickness of the bed and the rate of introduction of the mixture thereto being such as to effect selective adsorption of a substantial portion, at least, of the liquid branched chain hydrocarbon in said particles of resinous condensation product and thereby retaining and separating this portion of the hydrocarbons in said bed, removing the unadsorbed portion of the hydrocarbon mixture from the bed, subsequently discontinuing the introduction of the hydrocarbon mixture to said bed and liberating the adsorbed branched chain hydrocarbon from the solid particles of the bed.

2. The process of claim 1 further characterized in that said adsorbed branched chain hydrocarbon is liberated from the bed by passing through the bed a liquid straight chain hydrocarbon of substantially different boiling point than the adsorbed hydrocarbon.

3. The process of claim 1 further characterized in that said adsorbed branched chain hydrocarbon is liberated from the bed by passing through the bed a polar compound capable of displacing the branched chain hydrocarbon from the solid particles of the bed.

4. The process of claim 3 further characterized in that said polar compound is water.

5. The process of claim 3 further characterized in that said polar compound is methyl alcohol.

6. The process of claim 3 further characterized in that said polar compound is acetone.

7. The process of claim 1 further characterized in that said resinous condensation product is formed by the reaction of formaldehyde and urea.

8. The process of claim 1 further characterized in that said resinous condensation product is formed by the reaction of from about 1 to about 5 molar proportions of said urea-type compound per mole of said aliphatic aldehyde.

9. The process of claim 1 further characterized in that said resinous condensation product is formed by reacting said urea-type compound with an aldehyde containing not more than about 7 carbon atoms per molecule.

10. The process of claim 1 further characterized in that said resinous condensation product is formed from a urea-type compound containing a mono-N-alkyl group having not more than about five carbon atoms per alkyl group.

References Cited in the file of this patent

UNITED STATES PATENTS

| Number | Name | Date |
|---|---|---|
| 2,306,610 | Barrer | Dec. 29, 1942 |
| 2,395,491 | Mavity | Feb. 26, 1946 |
| 2,475,990 | Robertson | July 12, 1949 |
| 2,559,157 | Hirschler | July 3, 1951 |
| 2,566,353 | Mills | Sept. 4, 1951 |
| 2,582,415 | Claussen | Jan. 15, 1952 |
| 2,585,490 | Olsen | Feb. 12, 1952 |